Dec. 20, 1932.    J. KINDERVATER    1,891,545
REVERSE GEAR MECHANISM
Filed Dec. 29, 1930
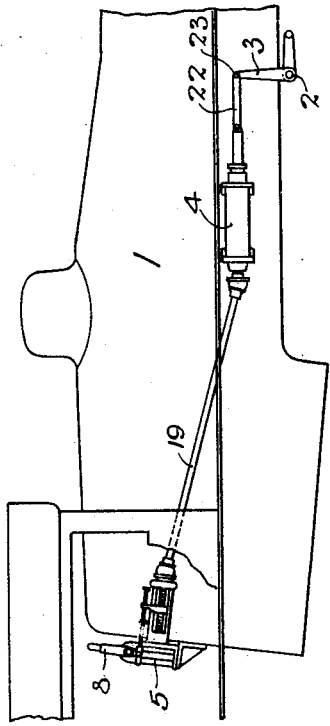
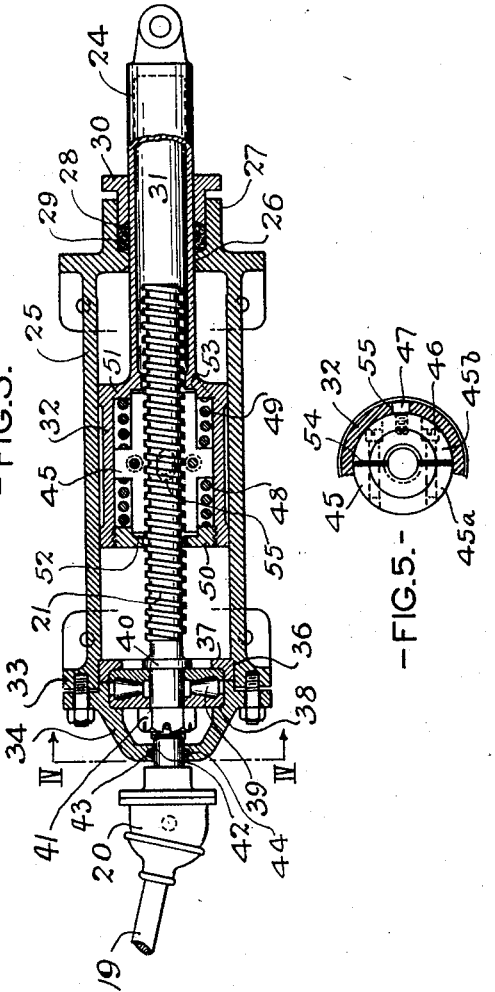
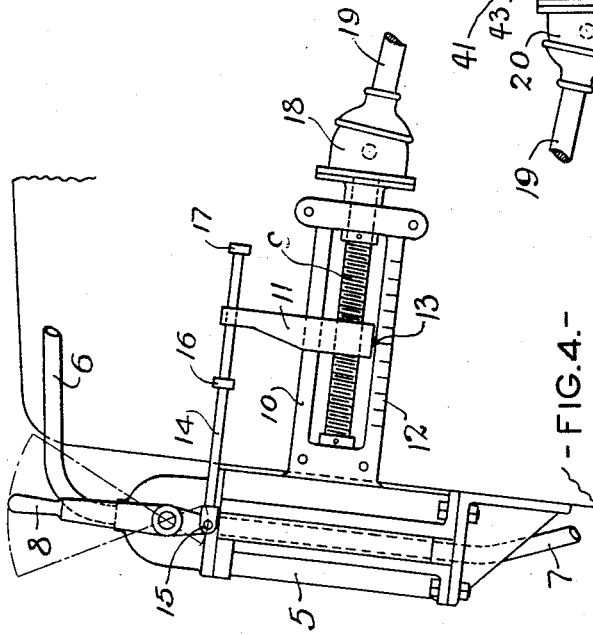
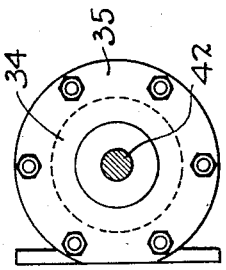
INVENTOR
*Julius Kindervater.*
BY
*S. C. Heaton*
ATTORNEY Patented Dec. 20, 1932

1,891,545

UNITED STATES PATENT OFFICE

JULIUS KINDERVATER, OF GREAT NECK, NEW YORK

REVERSE GEAR MECHANISM

Application filed December 29, 1930. Serial No. 505,325.

This invention relates to powder devices for operating reverse gear mechanisms of locomotives.

The object of the invention is to provide such a device, which is more efficient in operation than those heretofore known and which embodies a compact and sturdy structure, that is economical to manufacture and maintain. Other objects of the invention which constitute improvements over the prior art will hereinafter be apparent.

In present locomotive practice regarding power operated reverse gears, proper functioning is dependent upon the control valve and any slight loss of motion in the numerous pin connections embodied in the devices generally used, materially affects the cut-off. When in the operation of a locomotive, a line-in-line distribution valve position is necessary, any slight imperfection, automatically affecting the proper registration of the distribution valve, results in what is commonly known as creeping or shimmying. It has been found that in order to avoid such results and to properly maintain the valve gear at any desired position of cut-off, the reversing mechanism must be positive and not subject to variations as aforementioned.

Another problem is presented, in such mechanisms, by shocks which result from the sudden loads, that are frequently imposed upon the valve gear. The necessity of dampening these shocks or eliminating them to avoid their affecting the operation of the reverse gear mechanism is well recognized in the art.

This invention achieves the aforementioned positive action by the employment of a screw gear in the manner hereinafter described and at the same time, the mechanism of the invention is designed to afford a cushioning effect to absorb the shocks transmitted by the distribution valve motion.

The improvement claimed is hereinafter fully set forth.

In the accompanying drawing: Figure 1 is a side view of a part of a locomotive showing the reversing gear of the invention applied thereto; Fig. 2 is an enlarged view of the rear portion of Fig. 1; Fig. 3 is a longitudinal section of the reverse gear; Fig. 4 is a sectional view of Fig. 3 on the line IV—IV thereof; and Fig. 5 is an end view of the nut shown in Fig. 3.

In the practice of the invention referring descriptively to the specific embodiment thereof, which is herein exemplified, a locomotive, which is indicated generally by the numeral 1, is provided in the usual manner with a reverse shaft 2, having a reverse arm 3, connected thereto, the reverse shaft being connected to valve motion links, not shown. A reverse gear, indicated generally by the numeral 4 is suitably attached by means of studs or bolts to the side of the locomotive.

A reversible motor 5, of the Dake rotary engine type or any other suitable type, is secured to the boiler back head within the cab. Such an engine is described and illustrated in detail in Catalogue Number 28 of the Dake Engine Company of Grand Haven, Michigan. The motor is operated either by air or steam, supplied thereto through the inlet pipe 6, and exhausted therefrom through the pipe 7, which extends down the back head of the boiler into the locomotive ash pan (not shown). The motor is controlled by means of a valve (not shown) of any suitable type, which valve is operated by a throttle lever 8 operably connected therewith in the usual manner.

Connected to the motor 5 is a screw shaft 9 adapted to be reversibly rotated by said motor. A pair of arm members 10, and 12 are connected to the motor casing and a nut 11 is slidably attached to the upper arm member which serves as a guide therefor, the nut being adapted to move longitudinally therealong. The nut is provided with a bore extending therethrough and formed with a screw thread which meshes with the thread on the screw shaft 9, which passes through said bore. The nut is held from rotation by the upper arm 10, so that it will travel longitudinally along the shaft 9, when the latter is rotated. The lower arm member 12 is vernier graduated and a pointer 13 is formed on the lower end of the nut so as to indicate the percentage of cut-off. A rod 14 is pivotally connected at 15 to the end of the throttle lever 8 and is provided with spaced collars 16 and 17. Between said collars the rod 14 passes through an opening in an upper extension of the nut 11, and the said collars 16 and 17 constitute stops in the travel of the nut, in its extreme forward and backward positions, adapting the same to return the throttle lever and the valve connected thereto, to neutral position to stop the operation of said motor.

The forward end of the shaft 9 is connected by a universal joint 18 of the Spicer type, to a shaft 19 and the forward end of the shaft is connected by a similar universal joint 20, to a reverse screw shaft 21. Such a universal joint is described and illustrated in detail in Bulletin 44—4 dated August, 1929, of the Spicer Manufacturing Corporation of Toledo, Ohio. The reach rod 22 is pivotally connected at its forward end 23 to the upper end of the reverse shaft arm 3 and is similarly connected at its rear end to a plunger 24. The pivotal connections of the reach rod to the reverse shaft arm and the plunger prevent the rotation of the reach rod and plunger. The plunger 24 and the reverse screw shaft 21 are housed within a cylindrical casing 25. The forward end of the casing is formed with an opening 26 through which the plunger passes and is provided with a circular flange 27 encircling the plunger to afford a pocket 28 into which packing 29 is disposed. A gland 30 is disposed about the plunger and extends into the pocket to effect a compression of the packing and provide a tight fit, the gland being suitably fastened to the flange 27 by studs (not shown).

The plunger 24 is formed with a hollow interior indicated at 31 and is enlarged at its rear end to form a cylindrical inner casing 32 adapted to reciprocate within the outer casing 25, but prevented from rotating by means of the pivotal connections of the plunger and reach rod, as aforedescribed. Substantially the entire length of the shaft 21 within the casing 25 is provided with screw threads. The shaft passes centrally through the casing 32 and its forward portion extends into the hollow portion 31 of the plunger 24. The rear end of the casing 25 is formed with a circumferential flange 33 to which a cover member 34 is bolted by means of a corresponding flange 35 formed thereon. An interior circumferential depression 36 is formed in the rear end of the cylindrical wall of the casing 25, in which depression a thrust plate 37 is fitted. At the inner edge of the cover member 34 a circumferential depression 38 is formed, which together with the depression formed in the thrust plate 37 forms a pocket holding in position therein, a thrust roller bearing 39, of usual design. The central portion of the thrust plate 37 is provided with an opening and the shaft 21 passes through said opening and through the bearing 39. A collar 40 is integrally formed on the shaft 21 within the said opening, adjacent the bearing 39 and a lock nut 41 is provided on the shaft at the opposite side of the bearing thus securing the said shaft thereto. The extreme rear end of the shaft passes through an opening 42 in the cover member 34 and is connected as aforesaid to the shaft 19 by the universal joint 20. The inner periphery of the opening 42 is provided with a groove 43 in which felt packing 44 is disposed to provide a tight connection.

Within the inner casing 32, a split nut 45 is fitted, the nut being of cylindrical form and split longitudinally into two half sections 45a and 45b (see Fig. 5). The nut is provided with a bore formed with a screw thread which meshes with the thread of the screw shaft 21. The two sections 45a and 45b are held in place by screws 46 passing through one section and threaded in the other section. Laminated shims 54 are disposed between the sections and are readily removable for taking up wear of the screw threads of the nut. The central portion of the nut is enlarged so that its diameter is slightly less than the interior diameter of the inner casing 32. The casing 32 is formed with a longitudinal groove 55 into which a dowel 47 extends and along which the same is adapted to slide, the dowel being fixed in the section 45b of the nut and adapted thereby to prevent the rotation of the nut. In the spaces within the chamber 32 at the sides of the enlarged portion of the nut, helical springs 48 and 49 are disposed. The inner end of the spring 48, bears against the rear face of the enlarged portion of the nut and the outer end of the spring bears against a head 50 which is screwed into the rear end of the chamber 32. The inner end of the spring 49 bears against the other face of the enlarged portion of the nut and the outer end of spring 49 bears against the forward head 51 of the chamber 32. The head 50 is provided with an inner circular depression 52 into which the rear end of the nut 45 extends and the head 51 of the chamber 32 is likewise provided with an inner circular depression 53 into which the forward end of the nut extends. The length of the nut is of a less dimension than the distance between the faces of the opposing depressions 52—53 so as to leave clearance spaces between the ends of the nut and the faces of the depressions, said faces serving as stops to limit the longitudinal movement of the nut in relation to the chamber 32 in opposite directions. It will be apparent, therefore, that while the nut and its engaging shaft 21 is capable of such longitudinal movement relative to the plunger in two directions that the movement will be cushioned by one or the other of the springs 48 and 49. The entire thrust of the valve motion is thereby absorbed in the casing and no shocks will be transmitted, beyond the nut 45; these spring cushions taking the place of air cushions heretofore provided for reverse gears.

In the operation of the invention all of the moving parts within the casing 25 will be run in a bath of oil. The cut-off adjustment and reversing is effected by operating the valve lever 8 which sets the motor 5 in motion in the desired direction, causing the rotation of the shaft 9, which movement is transmitted through the universal joint 18, the shaft 19 and the universal joint 20 to the shaft 21, the rotation of the shaft 21 effecting longitudinal movement of the nut 45, and the plunger 24 and through the succeeding connections actuating the distribution valve. By means of the vernier 12 the cut-off may be set to hair line adjustment, the collars 16 and 17 operating to stop the motion and the operation of the gear at the extreme rear and forward positions only. Of especial advantage is the location of the motor, within the cab of the locomotive, where the same is protected from the elements and is readily accessible for lubrication or repair. It is pointed out, however, that the entire mechanism is practically fool proof and while desirably sensitive, the same is so constructed as to minimize any tendency towards wearing or breakage and the resultant necessity for repair or adjustment.

While there has, hereinbefore, been described and illustrated one preferred form of construction of the invention, it will be obvious that many and various changes in procedure, form, arrangement, and construction of parts, may be resorted to, and that this invention, therefore, is not limited to the particular embodiment disclosed but includes all and any such changes and modifications as come within the spirit and scope of the invention as defined in the appended claims.

The invention claimed and desired to be secured by Letters Patent is:—

1. In a reverse gear mechanism, the combination of a fixed casing; a reciprocable non-rotatable power rod having a hollow end portion extending into said casing at one end thereof and engaging the walls of the casing to permit sliding reciprocable movement, said hollow portion being provided interiorly with spaced spring seats; a nut disposed within said hollow portion; means preventing said nut from rotating while permitting limited longitudinal movement relative to said rod; means on said nut providing spring seats spaced respectively from and opposite to the first mentioned spring seats; helical springs disposed within said spaces having their respective ends abutting oppositely disposed seats to provide a resilient driving connection between said nut and said rod and adapted to resiliently resist end thrusts from said rod; a rotatable shaft extending within said casing through the opposite end thereof and having a threaded portion engaging the threads of said nut; a thrust bearing for said shaft engaging said casing and permitting rotation of said shaft but preventing longitudinal movement thereof, whereby by the rotation of said shaft said rod will be moved longitudinally; and power means for rotating said shaft.

2. In a reverse gear mechanism, the combination of a fixed casing, having an opening at one end thereof provided with a stuffing box; a reciprocable non-rotatable power rod having a hollow end extending into said casing through said stuffing box, said stuffing box providing a fluid-tight connection between said rod and casing, and said hollow portion engaging the walls of the casing to permit sliding reciprocable movement and being provided interiorly with spaced spring seats; a nut disposed within said hollow portion; means preventing said nut from rotating while permitting limited longitudinal movement relative to said rod; means on said nut providing spring seats spaced respectively from and opposite to the first mentioned spring seats; helical springs disposed within said spaces having their respective ends abutting oppositely disposed seats to provide a resilient driving connection between said nut and said rod and adapted to resiliently resist end thrusts from said rod; a rotatable shaft extending within said casing through the opposite end thereof and having a threaded portion engaging the threads of said nut; a thrust bearing for said shaft engaging said casing and permitting rotation of said shaft but preventing longitudinal movement thereof, whereby by the rotation of said shaft said rod will be moved longitudinally; means enclosing said opposite end of the casing provided with an opening through which said shaft extends; packing means engaging said closing means and said shaft to provide a fluid-tight connection therebetween, whereby the interior of said casing presents a fluid-tight lubricant chamber for the movable parts therein; and power means for rotating said shaft.

JULIUS KINDERVATER.